Figure 5:
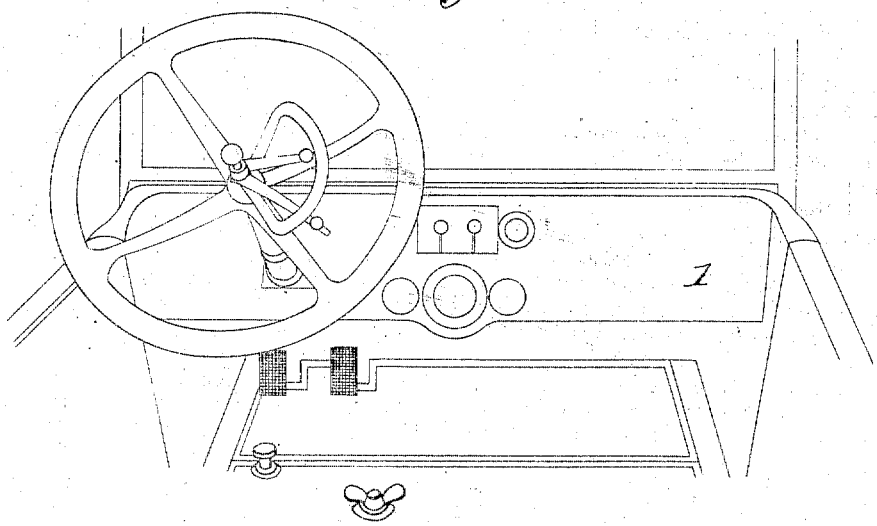

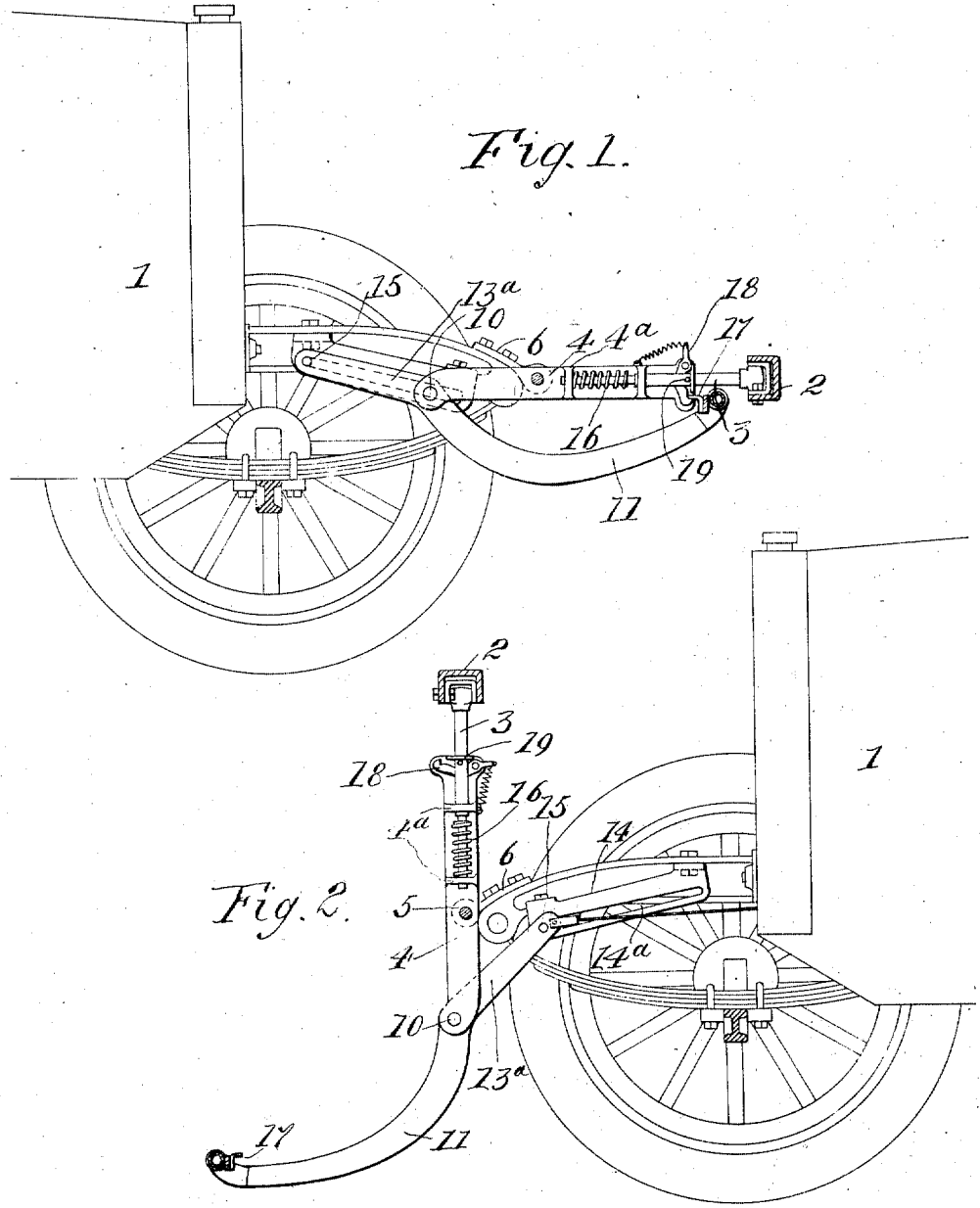

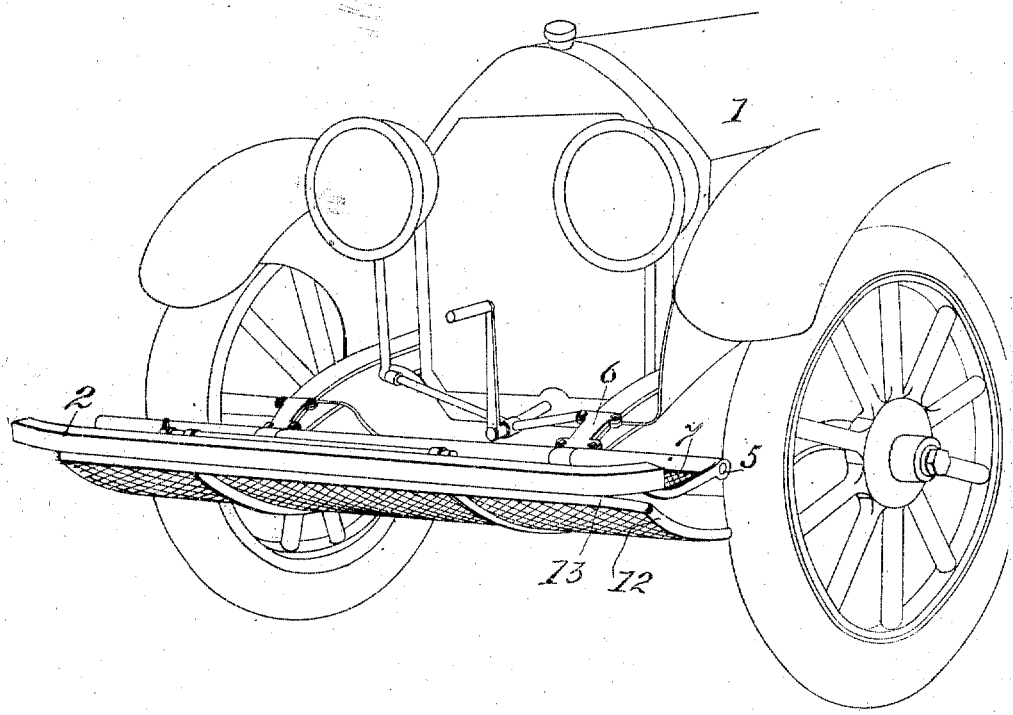

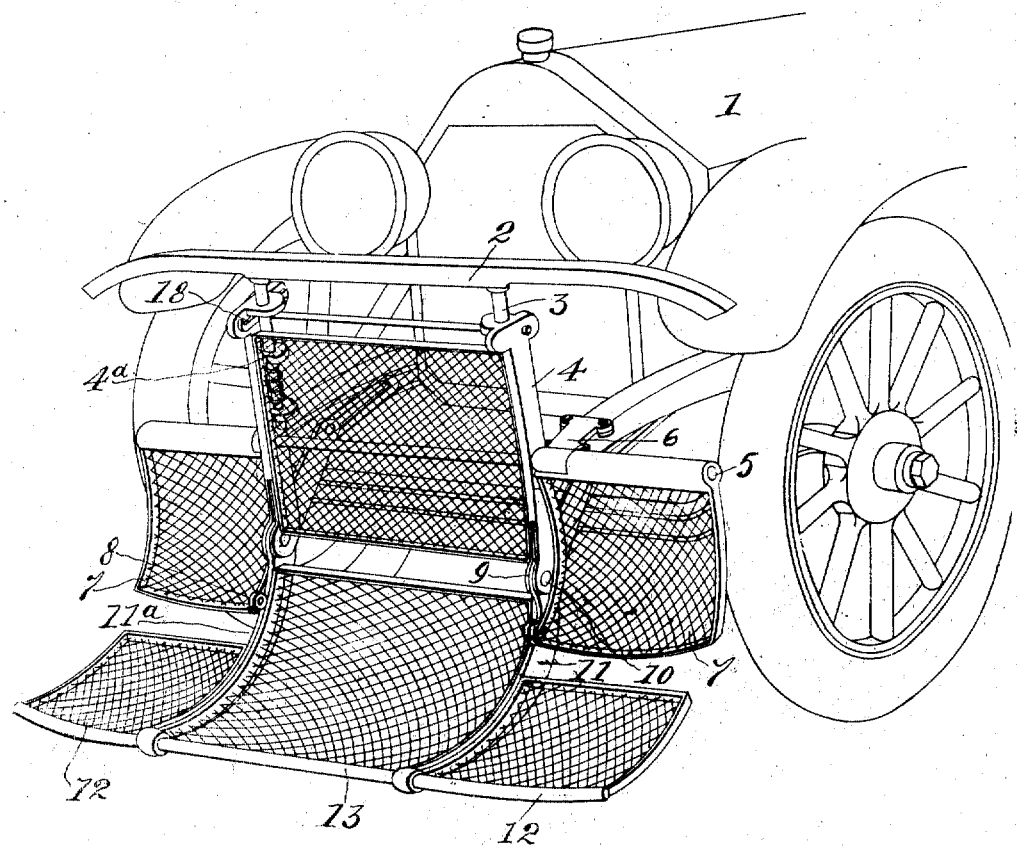

UNITED STATES PATENT OFFICE.

AUGUST A. ROTH, OF BALTIMORE, MARYLAND, ASSIGNOR TO SAFETY-FIRST APPLIANCES COMPANY, OF BALTIMORE, MARYLAND, A CORPORATION OF DELAWARE.

AUTOMATIC FENDER FOR MOTOR-VEHICLES.

1,216,845.     Specification of Letters Patent.     Patented Feb. 20, 1917.

Application filed April 26, 1916. Serial No. 93,634.

*To all whom it may concern:*

Be it known that I, AUGUST A. ROTH, a citizen of the United States of America, and resident of Baltimore, Maryland, have invented certain Improvements in Automatic Fenders for Motor-Vehicles, of which the following is a specification.

My invention relates to an improvement in fenders for automobiles and other types of motor vehicles.

The object of the invention is to furnish a fender in which a buffer is a constituent part, said fender having such construction that when the buffer strikes a person or obstruction the fender will be automatically released from its normal or closed position and caused to fall by gravity so that the person or object struck shall be picked up by the fender. Means are also provided whereby the driver of the vehicle, should there be danger of running into a pedestrian, may instantly release the fender so that it shall be brought to the said lowered or emergency position, and also whereby the driver may conveniently restore the fender to its set or its collapsed position.

In carrying out my invention I provide constructions, arrangements and combinations of parts hereinafter more fully described, shown in the drawings and pointed out in the accompanying claims.

Figure 6:
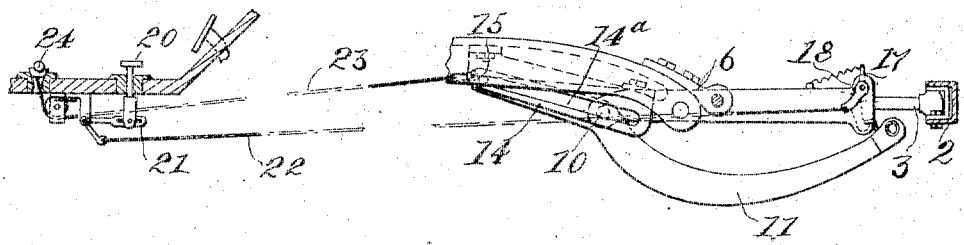

In the drawings, Figure 1 is a side elevation of the front portion of a motor vehicle to which my invention is attached, the fender mechanism being shown set for operative action on being struck. Fig. 2 is a similar view but showing the fender lowered ready to receive the person liable to be run down. Fig. 3 shows in perspective the front end of the vehicle the fender being closed up. Fig. 4 is a similar view representing the fender lowered as in Fig. 2. Fig. 5 is a top view of the front end of the vehicle showing features hereinafter referred to. Fig. 6 shows the fender mechanism in the position seen in Fig. 1 with means whereby the fender may be released by the foot of the operator so as to be dropped or opened, and also means enabling him to restore the mechanism to the position shown in the figure; or to a collapsed position as in Fig. 3.

In the drawings, 1 represents the front end of the vehicle which may be of any approved character, whether designed for touring or similar purposes, or of the truck type for commercial use. 2 is a buffer mounted upon rods 3. These buffer rods are carried by a framework shown generally by 4, which is pivotally carried by a round bar 5 set in bearings 6 secured to a fixed part of the machine. This framework 4 is furnished with netting as shown in Fig. 4. Loosely suspended on the round bar 5 and at each side of the frame 4 is a fender member 7 also having netting. These members 7 are each provided with a roller 8, for a purpose hereinafter mentioned. The inner ends of the side members of the frame 4 are bifurcated as shown by 9 in Fig. 4, and pivoted in these bifurcations by bolts or pins 10 are the curved bars 11 which enter into the fender structure. Outside of and attached to each curved bar 11 is a fender frame 12 also provided with netting. A bar 13 constitutes the front of the fender, coöperating in this respect with the buffer 2 when the parts are in the position shown in Fig. 3. The curved bars 11 are each integral with a bar or arm 13ª. Mounted upon the frame of the machine are slotted members 14, and each arm 13ª is provided with a pin or bolt 15 which rests in the slot 14ª of one of the members 14, as seen more especially in Figs. 1, 2 and 6. The buffer rods 3 are adapted to slide in the frame 4, they being mounted in the lugs 4ª between which lugs the rods are surrounded by compressible springs 16.

Certain parts not yet mentioned are described and their functions explained in the statement of operation which follows, it being understood that the latch and other fender mechanism is duplicated one set being at each side of the fender. Supposing the fender to be in the position shown in Figs. 1 and 6, it will be seen that the pins or bolts 15 rest at the inner ends of the slots 14ª of the members 14, and that the curved bars 11, by means of the lip 17, are in engagement with spring latches 18 carried by the frame 4. See particularly Fig. 1. On the buffer 2 striking an object the rods 3 are moved inward against the force of the springs 16, and the pins 19 of the buffer rods 3 push against the spring latches 18, thereby disengaging them from the lip 17, whereupon the pins 15 reaching the outer ends of the slots 14ª, the entire fender is brought by gravity from the position shown in Figs. 1 and 6 to that seen in Figs. 2 and 4 ready to pick up a person who may be in the way.

In the movement of the several parts of the fender, whether in the opening or closing action thereof, the rollers 8 of the members 7 roll upon curved tracks 11ª formed on the curved bars 11, as will be understood from Fig. 4. As shown in that figure, the frame 4, brought to vertical position, constitutes the rear of the fender, while the other members of the fender coöperate in forming a receptacle of considerable area to pick up a person who would otherwise be run over by the vehicle.

Fig. 6 shows at 20 a trip whereby the operator may use his heel for unlatching the fender from the position shown in that figure so that the fender may be instantly dropped. The means shown are the parts 20 and 21 and the cord 22 leading to the latches 18. The same figure shows means whereby the fender may be returned by the operator to its set position, this being done by means of the cord 23 leading from the handle 24 at the foot board back to the arm 11. By pulling on the cord 23 the fender frame is moved upon its pivot 5 and the fender brought back to closed position shown in Fig. 3. The folding of the fender upon itself to the position shown in Fig. 3 will be readily understood.

It is obvious that the device herein described may be modified in construction and arrangement in such ways as may be suggested to the skilled constructor without departing from the spirit of my invention.

I claim:—

1. In combination with a motor vehicle, a fender frame member mounted on a fixed pivot, said frame member having bifurcations, a buffer, buffer rods and latches carried by said frame member, curved arms, also constituting frame members, mounted in the bifurcations of said frame member, a lip carried by said arms, slotted members affixed to the vehicle, and pins connected with said arms and adapted to slide in said slots, whereby said curved arms, placed in engagement with said spring latches, may be disengaged therefrom by the impact of a body with the buffer, thus allowing the fender to fall by gravity.

2. In combination with a motor vehicle, a fender frame mounted on a fixed pivot, said frame member having bifurcations, a buffer, buffer rods, and latches carried by said frame member, curved arms, also constituting fender members, mounted in the bifurcations of said frame member, a lip carried by said arms, slotted members affixed to the vehicle, pins connected with said arms and adapted to slide in said slots, fender members mounted upon the aforesaid pivot, and rollers carried by said fender members adapted to run upon said curved arms, whereby the latter, placed in engagement with said spring latches, may be disengaged therefrom by the impact of a body with the buffer, thus allowing the fender to fall by gravity.

3. In combination with a motor vehicle, a fender frame mounted on a fixed pivot, said frame having bifurcations, a buffer, buffer rods, and latches carried by said frame member, curved arms, also constituting fender members, mounted in the bifurcations of said frame member, a lip carried by said arms, slotted members affixed to the vehicle, pins connected with said arms and adapted to slide in said slots, means under the control of the operator whereby said arms may be placed in engagement with said spring latches, and means also within his control whereby the engaged parts may be detached, and folded or collapsed.

AUGUST A. ROTH.

Witness:
JULIA B. ROBINSON.